US005423431A

United States Patent [19]

Westin

[11] Patent Number: 5,423,431

[45] Date of Patent: Jun. 13, 1995

[54] METHOD AND AN APPARATUS FOR WASTE HANDLING

[75] Inventor: Ivar Westin, Malmö, Sweden

[73] Assignee: Sellsberg Engineering AB, Malmo, Sweden

[21] Appl. No.: 768,518

[22] PCT Filed: Mar. 21, 1990

[86] PCT No.: PCT/SE90/00180

§ 371 Date: Sep. 19, 1991

§ 102(e) Date: Sep. 19, 1991

[87] PCT Pub. No.: WO90/11142

PCT Pub. Date: Oct. 4, 1990

[30] Foreign Application Priority Data

Mar. 23, 1989 [SE] Sweden .............................. 8901046

[51] Int. Cl.[6] .......................... B07C 5/02; B65G 47/12

[52] U.S. Cl. .................................... 209/539; 209/566; 209/587; 209/657; 209/914; 209/930; 198/442; 198/443

[58] Field of Search ............... 209/539, 541, 542, 545, 209/580, 581, 656, 657, 914, 930, 934, 587, 563, 564, 566; 198/367, 443, 442

[56] References Cited

U.S. PATENT DOCUMENTS

| | | | |
|---|---|---|---|
| 2,670,835 | 3/1954 | Huttmann | 198/367 X |
| 3,446,351 | 5/1969 | Born | 209/583 |
| 3,955,678 | 5/1976 | Moyer | 209/583 X |
| 4,717,026 | 1/1988 | Fischer et al. | 209/539 |
| 4,750,621 | 6/1988 | Akesson et al. | 209/539 |
| 4,750,639 | 6/1988 | Schaerer . | |
| 4,949,528 | 8/1990 | Palik | 209/930 X |
| 5,100,005 | 3/1992 | Noble et al. | 209/930 X |

FOREIGN PATENT DOCUMENTS

| | | | |
|---|---|---|---|
| 2645843 | 10/1990 | France | 209/539 |
| 2310994 | 11/1976 | Germany . | |
| 2411388 | 8/1979 | Germany . | |
| 3520486 | 12/1986 | Germany . | |

*Primary Examiner*—James R. Bidwell
*Assistant Examiner*—Tuan N. Nguyen
*Attorney, Agent, or Firm*—Ladas & Parry

[57] ABSTRACT

A method and an apparatus for sorting waste into different waste types. A first division of the waste is effected into at least two waste types in that each waste type is placed in a bag or container (100, 101) which is provided with at least one marking which indicates the waste type for which the bag is intended. The containers are collected and mixed together for transport to a common sorting plant in which the containers pass an identification mechanism (6) establishing, with the aid of the marking on the bag, the type of waste for which the bag is intended. The information is transmitted to a recording and control system (7) which, via a signal transmission device (73) switches a separating mechanism (9) for adjusting the same into a position in which the bag, on its passage of the sorting plant, is brought into a position reserved for that type of waste indicated by the marking on the container.

21 Claims, 1 Drawing Sheet

METHOD AND AN APPARATUS FOR WASTE HANDLING

The present invention relates to a method and an apparatus waste handling especially for sorting waste.

Steadily growing awareness is being paid to industrial and domestic waste, and considerable efforts have been made and are being made to process such waste in the best possible manner, inter alia to prevent injurious effects, to simplify handling of the waste and, as far as possible, to utilize the resource which such waste constitutes.

As a rule, waste from different collection points is allowed to be mixed and conveyed in common transport containers to plants for the separation of the waste or its deposition. Since the waste is allowed to become mixed on the way to the separation plants, the plants are supplied with a mixture of waste from which it is difficult to separate those fractions of the waste which allow for recovery and recycling. A number of experiments have been carried out in dividing up the waste at the source (sorting at source), but such experiments have not generally proved successful, because households lack the incentive to effect such sorting, because many households perceive the sorting and storage of separated waste as unpleasant, and because most buildings lack the space for storing of separated waste. The costs for transport of waste to its final deposition or to plants for the storage of separated waste also increase the sorting at the source, since such transports must be effected with the waste placed in separate containers. In turn, this requirement implies that the refuse collection vehicles must either be fitted with more than one collection receptacle, or that the refuse collection vehicles only collect one type of waste on each separate occasion.

An analysis of the composition of domestic waste and of the problems inherent in sorting the waste in the sorting plants shows that a sorting of the waste at the source into a wet fraction and a dry fraction entails considerable rationalization of the subsequent handling of the waste in the sorting plants, on condition that the waste sorted at the source can be transported to the sorting plants without the two fractions becoming intermixed. For economical reasons, this transport should also be effected in transport containers which are common to the waste.

The solution to the above problems will be attained by means of a method and an apparatus according to the present invention.

One of the advantages attained by application of the present invention is that existing refuse chutes in buildings can be employed in their present state. No special devices are required at the refuse chutes, such as indication buttons which are to be pressed to indicate the type of waste in order thereby to actuate means in the refuse storage chamber which cater for displacement of the waste to waste containers which correspond to the operating button which has been pressed. Such equipment is relatively bulky, for which reason many of the refuse storage chambers currently in use would need to be enlarged, and in addition all hatches to the refuse chute apart from that hatch being used must be blocked as long as any hatch for a special refuse chute is in the open position.

Furthermore, the present invention entails that refuse compactor vehicles which are already in service can be employed in their present state. Hence, no modification of the vehicles such that they are provided with different compartments for different types of waste is necessary. This circumstance is of major economical advantage, since it is obvious that the refuse collection vehicle fitted with a plurality of compartments will, in principle, be more complicated, and in particular if it is to be possible that the waste is compacted in each compartment. Furthermore, it must be expected that only one of the compartments will be completely filled, while the rest will remain only partly filled, which results in an inefficient utilization of the transport capacity of the vehicle.

Those refuse bags or containers which were closed in the household, for example by knotting need not, in the application of the present invention, be handled manually in the sorting plants, which entails an improved standard of hygiene. Those containers distributed to households, as a rule refuse bags or sacks, are, in certain cases of a size which renders the containers unuseable or at least difficult to use for newspapers or large packaging or wrapping. As a result, the households will be more inclined to place such waste in special collection containers within or adjacent to the buildings. This in turn will lead to an increased recovery of paper waste.

BRIEF DESCRIPTION OF THE DRAWINGS

The nature of the present invention and its aspects will be more readily understood from the following description relating thereto, with particular reference to appended FIG. 1.

DETAILED DESCRIPTION OF A PREFERRED EMBODIMENT

Figure 1:
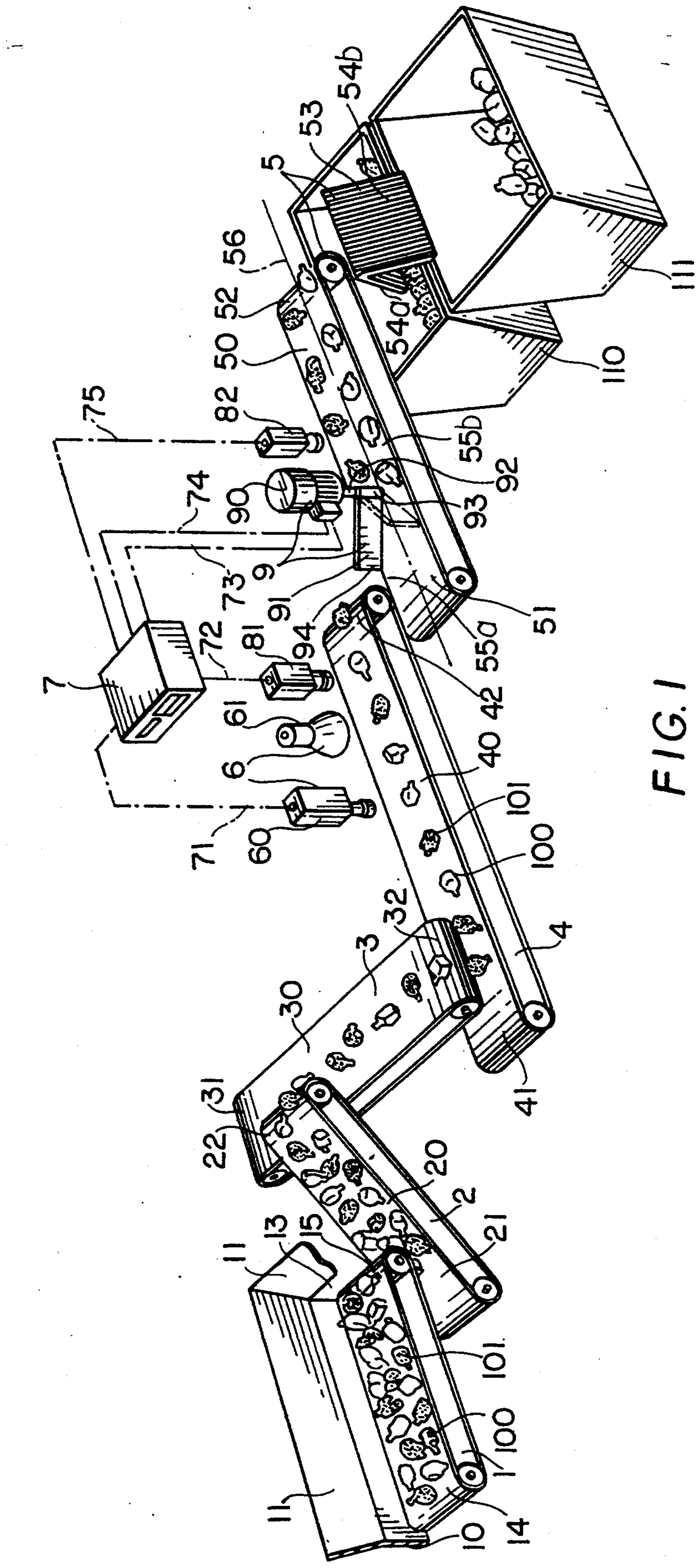

FIG. 1, which illustrates a preferred embodiment of the present invention, shows a first conveyor or storage feeder 1, a second conveyor 2, a distribution conveyor 3, and an identification conveyor 4, unloading means 5, identification means 6, recording and control means 7, first and second detecting means 81, 82, respectively, and separating means 9.

In the figure, the storage feeder 1 is shown as a conveyor belt 14 on which, for instance, a refuse collection vehicle tips collected waste. This waste consists of small containers 100, 101, which will hereafter be referred to as bags. As a rule, the conveyor belt is recessed in a shaft which is defined by side walls 10 which terminate at the top by means of flared inwardly guiding surfaces 11. Only one such side wall is shown in the figure. A discharge opening 13 is provided at the discharge end 15 of the conveyor belt.

The second conveyor 2 is provided with an infeed portion 21 which is disposed in the region of the discharge opening 13. The conveyor also includes a discharge portion 22 and, in the embodiment illustrated in FIG. 1, the conveyor is provided with a conveyor belt 20. The discharge portion of the conveyor is, as a rule, located at a higher level than its infeed portion.

The discharge portion 22 of the second conveyor connects to the distribution conveyor 3 which is shown in the figure as a conveyor belt 30. The distribution conveyor has an infeed portion 31 and a discharge portion 32. The orientation of the second conveyor and the orientation of the distribution conveyor are interrelated such that, seen from above, the direction of displacement of the bags in the transitional region makes a relatively large angle, as a rule of the order of approx. 90°.

The discharge portion 32 of the distribution conveyor 3 connects to an infeed portion 41 of the identification conveyor 4. Also at this transitional region, the direction of displacement of the bags is, as a rule, changed relatively abruptly, as a rule by approx. 90°. The identification conveyor has a discharge portion 42. In the embodiment illustrated in FIG. 1, the distribution conveyor includes a conveyor belt 40.

The unloading means 5 is provided with an infeed portion 51 and a discharge portion 52. The discharge portion 42 of the identification conveyor connects to the infeed portion 51 of the unloading means. In FIG. 1, one embodiment of the discharge means is shown in which this comprises a conveyor belt 50 and a distribution device 53 which is disposed in association with the discharge portion in order to ensure that bags which leave the conveyor belt 50 from the one 55*a* or the other 55*b* edge area of the conveyor belt are separated from one another. The distribution device is shown with guide surfaces 54*a*, 54*b* disposed at an angle to one another and substantially immediately merging into one another along the upper edge of each respective guide surface. This edge is located substantially vertically beneath the centre line 56 of the conveyor belt 50.

Collection receptacles 110, 111 are disposed beneath the distribution device 53 for receiving bags which have left the conveyor belt 50 from its one 55*a*, or its other 55*b* edge region, respectively.

In the region of the identification conveyor, there is disposed at least one identification means 6 and at least one first detector means 81. The identification means includes the detector 60 and, as a rule a light source 61. In a preferred embodiment, the first detector means consists of an ultrasonic transmitter/ultrasonic receiver and is, in certain embodiments, placed upstream, while in other embodiments, downstream of the identification means 6.

The separating means 9 is disposed in the area of the discharge portion 42 of the identification conveyor and/or the infeed portion 51 of the unloading means, the separating means being switchable between at least two sorting positions. The separating means is provided with drive means 90 for switching of the separating means to its separating positions. In the illustrated embodiment, the separating means 9 is provided with an arm 91, which, through a shaft 92, is connected to the drive means 90. The shaft 92 is secured to the arm at its one end region 93 which is placed substantially in the area of the centre line 56 of the conveyor belt 50, and, as a rule, between the centre line and the one edge of the belt. The arm makes an oblique angle with the longitudinal axis of the conveyor belt and has, when it is located in the operative position, its opposing end region 94 located in the region of one of the opposite edges 55*a*, 55*b* of the conveyor belt 50. At that end region 93 which connects to the shaft 92, the arm is located more proximal to the discharge portion 52 of the unloading means than the opposing end region 94 thereof. In FIG. 1, the arm is shown as located above the conveyor belt 50 of the unloading means 5, but it will be obvious to one skilled in the art that in certain embodiments the separating means is disposed in association with the conveyor belt 40 of the identification conveyor 4 and, in this instance, is located downstream of the identification means 6, and, in embodiments including the first detector means 81, also downstream of the detector means.

In one embodiment of the present invention, a second detector device 82 is disposed in association with the separating means 9, In certain embodiments, said means is set to detect bags which are undergoing displacement past the separating means, while in other embodiments, said means is set to detect that a bag has passed the separating means.

The recording and control means 7 is connected, through a first signal transmission means 71, to the identification means 6, through a second signal transmission means 72 to the first detector means 81, through third and fourth signal transmission means 73, 74 to the separating means 9, and, through a fifth signal transmission means 75, to the second detector means 82.

When the present invention is put into practice, a first division of the waste is effected in that the waste is divided, for instance in the household, into at least two types of waste in which each type of waste is placed in a special container or bag 100, 101, which is designed specifically for the waste type in question. As a rule, the container is designed as a bag and is formed of flexible and strong material which, for example, makes it possible to close the bag by a knot. Practical experiments have shown that it is possible to combine flexibility and strength such that the bags are capable of withstanding those stresses to which they are subjected during their subsequent handling, including any possible compaction of waste in refuse collection vehicles. Hereinafter, the designation bag will be employed without implying any limitation, for the flexible containers.

Each bag is provided with at least one marking which indicates the type of waste for which the bag is intended. In certain embodiments this marking consists of a colour marking, for example a plurality of regions of the bag (or the whole bag) are of a predetermined colour and/or provided with special print, embossed printing may also be relevant, which indicates the waste type for which the bag is intended. In a simple embodiment of the present invention, markings are employed for but two types of waste, viz. one marking for "wet" waste and one marking for "dry" waste. For many reasons, it is desirable that also paper waste, for example newspaper waste, be sorted out from the waste at the source and, in a preferred embodiment of the present invention, the bags have consequently been dimensioned in terms of volume so as to render the deposition of newspapers therein difficult. In the employment of conveyor belts, the belts carry, in certain embodiments, a colour which corresponds to the colour marking of one of the bags. In embodiments in which, for instance, two different colours are employed to distinguish, from the set of bags, bags marked with these colours and separate from one another and from other bags, the colour of the belt is selected so as to deviate from the colours employed for both of the bag types.

The bags are thereafter placed in the refuse storage chamber of the building, for example are deposited in the refuse chute and are collected on the occasion of the normal refuse collection. Even if each bag contains a specific waste type, the bags are mixed together with one another and are transported to a sorting plant common to a plurality of households. In the plant, the bags are tipped onto the storage feeder 1 and are displaced thereby, via the discharge opening 13, to the second conveyor 2. As a rule, this operates at a higher displacement speed than the storage feeder 1, and in the illustrated embodiment it also inclines upwardly in the direction of movement of the bags. The level difference between the infeed portion and discharge portion of the second conveyor 2 implies a certain levelling out of the thickness of the layer of bags being displaced by the conveyor, in that the bags slide towards the conveyor belt 20 and when there is also a layer of bags lying on subjacent bags. Naturally, this sliding tendency is determined by the friction between the bags and the belt, mutually between the bags, and also by the inclination of the belt. However, it has proved appropriate in a preferred embodiment of the present invention to allow the bags generally to slide along the belt but provide the belt with guiding means (not shown in FIG. 1) which retard or prevent the sliding movement and carry the refuse bags on movement of the belt. It will hereby be possible to even out those bag accumulations which occasionally occur on the discharge of bags by the storage feeder.

It is obvious that when a refuse collection vehicle has emptied its load into the storage feeder, an excessively large accumulation of bags may occur at the infeed portion 21 of the second conveyor 2. Consequently, in certain embodiments of the present invention, there are provided in association with the infeed portion of the second conveyor, "level guards", for example transmitters and receivers of infra red light which stop and start the movement of the conveyor belt 14 of the storage feeder 1 in accordance with the variations of the thickness of the bag layer in the region of the infeed portion 21 of the second conveyor. When the thickness of the layer exceeds a predetermined level, the conveyor belt of the storage feeder is stopped and when the thickness falls below a predetermined level, the belt is started.

Via the discharge portion 22 of the second conveyor, the bags are transferred to the distribution conveyor 3 which, as a rule, operates at a displacement speed which exceeds the displacement speed of the second conveyor. As a result of the angle which the two conveyors make in relation to one another, in combination with the difference in displacement speed, a further spread of the bags in their direction of displacement will take place on the distribution conveyor. From the discharge portion 32 of the distribution conveyor, the bags are fed to the identification conveyor 4 which, as a rule, works at a higher displacement speed than the distribution conveyor. As a result, the bags will be substantially aligned. It will be obvious to one skilled in the art that in certain embodiments of the present invention in which large volumes of bags are simultaneously fed to the storage feeder, problems may arise at the identification conveyor, because the bags are located too close to one another or abut against one another on the identification conveyor. It will further be obvious to one skilled in the art that, in certain embodiments of the present invention, both the number of conveyors preceding the identification conveyor and the speed changes at the transitions between the conveyors may be adapted in accordance with the relevant volume of bags supplied from the storage feeder on each occasion.

When the containers or bags pass the identification means 6, this identifies the marking or markings which indicate the type of waste for which the bag is intended and transmits, via the first signal transmission means 71, corresponding information to the recording and control means 7. Via signal transmission means (not shown), the recording and control means 7 receives information on the displacement speed of the conveyor belt 40 of the identification conveyor 4 and of the conveyor belt 50 of the unloading means. The recording and control means calculates the time which elapses for the displacement of the bag to the separating means 9 and ensures, via the signal transmission means 73, 74, that the obliquely inclined arm of the separating means is in a position which is adapted in correspondence to the marking of the bag. On occasions when the immediately preceding bag carries a marking corresponding to the same waste type as the actually relevant type, the recording and control means is, as a rule, operative solely to check that the orientation of the obliquely inclined arm 91 is the correct one. When the bag passes the separating means 9, it is moved by the obliquely inclined arm 91 towards one of the edge regions of the conveyor belt 50 of the unloading means 5. When the bag passes the discharge portion 52 of the conveyor belt, the bag falls down into one of the receptacles 110, 111. The obliquely inclined guide surfaces 54*a*, 54*b* of the distribution device 53 ensure that the bag is guided down into one of the receptacles 110, 111, even if the bag is located relatively close to the centre line 56 of the belt 50.

In a preferred embodiment, the first detector means 81 is disposed in the region of the identification means 6 in order to ensure the presence of bags 100, 101 in this region. Information hereon is transferred via the second signal transmission means 72 to the recording and control means 7. The first detector means 81 supplements the information from the identification means 6 and, in those embodiments of the present invention in which the detector means is included in the apparatus according to the invention, switching of the separating means 9 is, as a rule, effected based on the point in time of the identification by the detector means of the presence of a bag on the conveyor belt 40 of the identification conveyor 4.

In certain embodiments there is provided, in association with the separating means 9, means 82 which establishes when a bag passes the separating means, or that a bag has passed. This information is transferred via the fifth signal transmission means 75 to the recording and control means 7 which, thereafter, via the third transmission means 73, transmits a signal of the separating means for switching thereof if such switching is required, for displacement of a subsequent bag to the correct side of the conveyor belt 50. In certain embodiments, the separating means 9 is provided with means which establish the presence of a bag in the region of the separating means. According to a simple embodiment, such is effected in that the separating means registers that one or more bags abut against its obliquely inclined arm 91. Information hereon is transmitted to the recording and control means via the fourth signal transmission means 74. In certain cases the separating means 9 is operative so as to maintain its adjusted position as long as a bag is under displacement past the separating means, for example abuts against its obliquely inclined arm 91. In certain embodiments this function is attained in that the separating means is blocked against receipt of signals from the recording and control means 7 as long as the bag has not passed the separating means, while in other embodiments the separating means receives the signal but does not effectuate received information on switching until after the bag has passed. In certain embodiments, the separating means 9 includes means for registration and transmission of signals indicating the current position (location) of the separating means.

The first and second detector means 81, 82, respectively, are employed in certain embodiments to count the number of bags passing through the sorting plant. Since the identification means 6 only emits signals for bags marked for a certain type or types of waste, information will be received on the total number of bags only with the aid of signals from the detector means 81, 82, for example the signals from the first detector means 81. As a rule, the purpose of the recording and control means 7 is to execute the requisite storage of information about and calculation on the number of bags of a specific type of waste.

The present invention allows the sorting of bags (containers) of different sizes, shapes and weights. In certain embodiments it may be employed to sort out recoverable material, for example material which may be composted, glass, aluminum foil, etc.

The above detailed description has referred to but a limited number of embodiments of the present invention, but one skilled in the art will readily perceive that the present invention encompasses a large number of embodiments without departing from the spirit and scope of the appended claims.

I claim:

1. A system for sorting waste comprising a plurality of containers (100, 101) provided with respective markings indicating the type of waste for which the container is intended, at least two mutually angularly disposed conveyors (2, 3), means for supplying a random, commingled quantity of containers containing respective different waste types, to said conveyors for displacement of the containers one after the other in spaced relation to an identification conveyor (4); at least one identification means (6) disposed, in association with the identification conveyor, for distinguishing containers (101) by the markings thereon, a separating means (9) for separating the containers based on the distinguishing of the containers by said at least one identification means (6); a recording and control means (7) connected via signal transmission means (71, 73, 74) to said at least one identification means (6), and to said separating means (9) for indicating, after receipt of signals from said at least one identification means (6) to the separating means (9) via the signal transmission means (73), a correct sorting state for said separating means with reference to the immediately following container; means included in the separating means (9) for moving said separating means to sort the containers, detector means for detecting the presence of said containers before and after they have reached the separating means, and signal transmission means connecting said detector means to said recording and control means to transmit signals thereto upon detection of each container by said detector means, said detector means acting in combination with said at least one identification means to adjust the sorting state of said separating means based on the identification of said containers by said identification means and in a point in time of said detecting of said containers by said detector means.

2. A system as claimed in claim 1, wherein the identification conveyor (4) is disposed at an angle to the conveyor (3) which precedes the identification conveyor, at least one of the conveyors (2, 3) which precedes the identification conveyor having a speed of displacement for the containers (100, 101) which is less than the speed of the conveyor receiving the containers.

3. A system as claimed in claim 1, wherein at least one of the conveyors (2, 3) preceding the identification conveyor is provided with a discharge portion (22) which is located at a higher level than an infeed portion (21) of the conveyor.

4. A system as claimed in claim 1, wherein said detector means comprises a first detector (81) for detecting the presence of containers (100, 101) on the identification conveyor (4), in a transition between the identification conveyor and the conveyor belt (50) of the unloading means (5), or on the conveyor belt of the unloading means; and a signal transmission means (72) between the first detector (81) and the recording and control means (7) for the transmission of signals from the first detector to the recording and control means (7) for each detected container.

5. A system as claimed in claim 1, wherein said detector means includes in the area of the separating means (9), a second detector (82) for detecting passage of said containers (100, 101) relative to the separating means, said second detector being operative to transmit, via a signal transmission means (75), a signal to the recording and control means (7) of passage of a detected container; said recording and control means being operative, once the container has passed the separating means, to transmit, via the signal transmission means (73) for adjusting the separating means, a signal regarding adjustment of the separating means (9) to a sorting position adapted for a subsequent container.

6. A system as claimed in claim 1, wherein the separating means (9) comprises means for emitting signals to the recording and control means (7) via the signal transmission means (74) on the sorting position of the separating means.

7. A system as claimed in claim 1, wherein the markings on the containers comprise color coding, said identification means comprising means for sensing the color coding on the containers.

8. A system as claimed in claim 7, wherein said containers comprise flexible bags.

9. A system as claimed in claim 1, wherein said plurality of containers are flexible bags of different size and shape depending on the type and amount of waste therein, said system further comprising a storage feeder for receiving randomly commingled bags of different size and shape, an upwardly inclined conveyor belt having an upper end at a level above a first of said conveyors, and means for advancing the randomly commingled bags of different type in a forward direction from said storage feeder to the upwardly inclined conveyor belt, said upwardly inclined conveyor belt travelling in the same direction of advance of the randomly commingled bags of different type from said storage feeder to continue the advance of the bags in the same direction, but at an upwards inclination, to said first of said conveyors.

10. A method for sorting waste into different waste types comprising:

dividing waste into different waste types and placing the different waste types into respective waste containers, providing each container with a respective marking representative of the waste type to be placed in the container, collecting and commingling containers of different waste types from a plurality of individual sources, transporting the collected and commingled containers of different waste types in a transport vehicle to a sorting plant, the waste being divided into the different waste types in individual households and the containers of the respective waste types being collected from the individual households and commingled in said transport vehicle which transports the containers to the sorting plant, removing the commingled containers from the vehicle and advancing the containers in commingled state on an upwardly inclined conveyor of the sorting plant, depositing the containers one after another from the top of the inclined conveyor onto a distribution conveyor of the sorting plant, advancing the containers on the distribution conveyor one after the other in a random distribution past an identification means, producing signals in said identification means corresponding to the markings on the containers and thereby to the waste type associated therewith, passing the signals from the identification means to a recording and control means to operate a separating means to separate the containers on the basis of the marking thereof so that the containers advance along separate respective paths according to the type of waste in the containers, and collecting the containers at separate collection sites for respective types of waste, and, wherein the containers are removed from the transport vehicles by depositing the containers into a storage feeder which is in the form of a compartment having a bottom transport belt which conveys the containers to the upwardly inclined conveyor, the containers being transported by said upwardly inclined conveyor in the same direction as on said transport belt but along an upwardly inclined path relative thereto and at a higher speed.

11. A method as claimed in claim 10, characterized in that the marking is a color marking.

12. A method as claimed in claim 10, characterized in that in addition to the identification means a first detector means identifies the presence of said containers; that said first detector means transmits signals hereon to the recording and control means to relate the received signal to the signals, respectively, received from the identification means; and that the recording and control means, for switching of the separating means, transmits thereto a signal for adjustment of the separating means to a position which corresponds to the waste type identified for the container.

13. A method as claimed in claim 10, characterized in that the separating means, after each switching, transmits to the recording and control means a signal indicating the actual position of the separating means.

14. A method as claimed in claim 10, characterized in that the separating means or a second identification means transmits a signal to said recording and control means when a container passes or has passed the separating means.

15. A method as claimed in claim 10, wherein said marking of said containers is obtained by forming the containers of different color corresponding to the respective waste type to be placed in the containers.

16. A method as claimed in claim 10, comprising advancing the upwardly inclined conveyor at a speed slower than the speed of the distribution conveyor.

17. A method as claimed in claim 10, wherein the containers are flexible bags and when collected and commingled from the individual households are of different size and shape.

18. A system for sorting waste comprising a plurality of containers provided with respective markings indicating the type of waste for which the container is intended, means for collecting the containers from users in a commingled state of different waste types, first and second conveyors, means for supplying a random, commingled quantity of the collected containers containing respective different waste types to said first conveyor, said first conveyor being upwardly inclined for advancing the containers at a determined speed to the second conveyer, said second conveyor being driven at a higher speed than said first conveyor to advance the containers, one after the other in spaced relation, to an identification conveyor, at least one identification means disposed in association with the identification conveyor for distinguishing between the containers on the identification conveyor by the markings on the containers, a separating means for separating the containers based on the markings identified thereon, a recording and control means connected via signal transmission means to said at least one identification means and to said separating means to cause operation of the separating means in response to signals produced by said at least one identification means and means associated with said separating means for conveying the separated containers containing respective different waste types along separate paths, said means for supplying said containers to said first conveyor comprising a storage feeder including a bottom transport belt having an end overlying said first conveyor, said transport belt and said first conveyor being driven in the same direction to transport said containers from said storage feeder to said first conveyor in the same direction.

19. A system as claimed in claim 18, wherein said second conveyor and said identification conveyor are substantially horizontal.

20. A system as claimed in claim 18, wherein said containers are flexible bags of different sizes and shapes.

21. A system as claimed in claim 18, wherein said plurality of containers are flexible bags of different size and shape depending on the type and amount of waste therein, said upwardly inclined first conveyor having an upper end at a level above said second conveyor.

* * * * *